United States Patent
Lalouche et al.

(10) Patent No.: US 11,823,021 B2
(45) Date of Patent: Nov. 21, 2023

(54) SYSTEM AND METHOD FOR ENSEMBLE EXPERT DIVERSIFICATION VIA BIDDING

(71) Applicant: YAHOO ASSETS LLC, Dulles, VA (US)

(72) Inventors: Gal Lalouche, Sunnyvale, CA (US); Ran Wolff, Geva-Carmel (IL)

(73) Assignee: YAHOO ASSETS LLC, Dulles, VA (US)

(*) Notice: Subject to any disclaimer, the term of this patent is extended or adjusted under 35 U.S.C. 154(b) by 475 days.

(21) Appl. No.: 16/944,415

(22) Filed: Jul. 31, 2020

(65) Prior Publication Data
US 2022/0036248 A1 Feb. 3, 2022

(51) Int. Cl.
*G06N 20/00* (2019.01)
*G06N 20/20* (2019.01)
*G06N 5/043* (2023.01)

(52) U.S. Cl.
CPC ............ *G06N 20/20* (2019.01); *G06N 5/043* (2013.01)

(58) Field of Classification Search
CPC ... G06N 5/00–048; G06N 20/20; G06Q 30/08
USPC .............................. 706/12, 45–62; 705/26.3
See application file for complete search history.

(56) References Cited

U.S. PATENT DOCUMENTS

| | | | |
|---|---|---|---|
| 10,719,301 B1* | 7/2020 | Dasgupta | G06F 8/33 |
| 10,878,567 B1 | 12/2020 | Abid et al. | |
| 11,321,629 B1 | 5/2022 | Rowan et al. | |
| 11,501,190 B2 | 11/2022 | Jadon et al. | |
| 11,501,210 B1 | 11/2022 | Zhdanov et al. | |
| 2002/0087613 A1 | 7/2002 | Harif | |
| 2007/0244800 A1* | 10/2007 | Lee | G06Q 40/04 705/37 |
| 2009/0325685 A1 | 12/2009 | Webb et al. | |
| 2014/0074641 A1 | 3/2014 | Wang | |
| 2018/0068654 A1 | 3/2018 | Cui et al. | |
| 2019/0036716 A1 | 1/2019 | Kasaragod et al. | |
| 2020/0074146 A1 | 3/2020 | Prabhudesai et al. | |
| 2020/0311615 A1 | 10/2020 | Jammalamadaka et al. | |
| 2020/0342462 A1 | 10/2020 | Todd et al. | |
| 2021/0042771 A1* | 2/2021 | Sharma | G06N 20/00 |
| 2021/0216813 A1 | 7/2021 | Pouyan et al. | |

(Continued)

FOREIGN PATENT DOCUMENTS

WO 2020092900 A2 5/2020

OTHER PUBLICATIONS

Koutsopoulos et al. "Auctioning Data for Learning", 2015, IEEE 15th International Conference on Data Mining Workshops.*

(Continued)

*Primary Examiner* — Jue Louie
(74) *Attorney, Agent, or Firm* — Venable LLP

(57) ABSTRACT

The present teaching relates to method, system, medium, and implementations for machine learning. A check is performed on a level of available bidding currency for bidding a training sample that is used to train a model via machine learning. A bid in an amount within the available bidding currency is sent, to a source of the training sample, for the training sample. The training sample is received from the source when the bid is successful. A prediction is then generated in accordance with the training sample based on one or more parameters associated with the model and is sent to the source.

20 Claims, 13 Drawing Sheets

(56) References Cited

U.S. PATENT DOCUMENTS

2021/0342736 A1  11/2021  Singh et al.

OTHER PUBLICATIONS

Jiao et al. "Profit Maximization Mechanism and Data Management for Data Analytics Services", 2018, IEEE Internet of Things Journal.*
Agarwal et al. "A Marketplace for Data: An Algorithmic Solution", Jun. 2019, EC '19: Proceedings of the 2019 ACM Conference on Economics and Computation.*
Office Action dated Jan. 19, 2023 in U.S. Appl. No. 16/944,459.
Final Office Action dated Jun. 12, 2023 in U.S. Appl. No. 16/944,324.
Anifowose, "Ensemble Machine Learning: The Latest Development in Computational Intelligence for Petroleum Reservoir Characterization", May 2013, Paper presented at the SPE Saudi Arabia Section Technical Symposium and Exhibition, Al-Khobar, Saudi Arabia.
Non-Final Office Action dated Sep. 12, 2023 in U.S. Appl. No. 16/944,503.
Final Office Action dated Aug. 8, 2023 in U.S. Appl. No. 16/944,459.

\* cited by examiner

SYSTEM AND METHOD FOR ENSEMBLE EXPERT DIVERSIFICATION VIA BIDDING

CROSS-REFERENCE TO RELATED APPLICATIONS

The present application is related to U.S. patent application Ser. No. 16/944,324, filed Jul. 31, 2020, U.S. patent application Ser. No. 16/944,459, filed Jul. 31, 2020, and U.S. patent application Ser. No. 16/944,503, filed Jul. 31, 2020, the contents of which are incorporated herein by reference in their entireties.

BACKGROUND

1. Technical Field

The present teaching generally relates to computer. More specifically, the present teaching relates to machine learning.

2. Technical Background

Artificial intelligence (AI) techniques have been developed for decades. With the ubiquitous presence of computing devices, network connections, and data in the modern society, AI techniques have been used to make machines learn so that such machines can possess certain "knowledge" and do work that are traditionally done by humans. Different techniques have been developed to improve machine learning in terms of, e.g., speed, performance, or adaptivity, so that such machines may enhance the ways to perform such traditional human tasks. More and more machines are operating as human experts in our society.

In recent years, techniques in a machine learning paradigm called ensemble of experts have been developed by which multiple machines/experts are learned using the same data and each may learn differently from the data due to that each of them may, e.g., use a different algorithm, be configured with different meta-information such as parameters used during the learning, or input a different part of the training data. In such a learning paradigm, the greater the diversity of the learners, the better the ensemble. However, this requires effective diversification because it allows the learned experts to make decisions with different perspectives based on different learned knowledge. Different learned experts' decisions are integrated to form a decision of the ensemble. For example, some state-of-the-art ensemble learner system merges results from different machine experts by re-weighing the sample distribution of the individual learners in the system based on some criterion.

FIG. 1A (PRIOR ART) illustrates a current expert diversification scheme. In this scheme, there are a plurality of experts, expert 1 140-1, expert 2 140-2, . . . , and expert K 140-K. Each of the experts are trained by a corresponding expert trainer, i.e., expert 1 trainer 120-1 for training expert 1 140-1, expert 2 trainer 120-2 for training expert 2 140-2, . . . , expert K trainer 120-K for training expert K 140-K. As can be seen, each trainer is provided or configured with corresponding metadata, i.e., expert 1 trainer 120-1 is configured to operate based on its metadata 130-1, expert 2 trainer 120-2 is configured to operate based on its metadata 130-2, . . . , and expert K trainer 120-K is configured to operate based on its corresponding metadata 130-K. FIG. 1B (PRIOR ART) shows a slightly improved ensemble diversification scheme, which is similarly structured as what is shown in FIG. 1A except that there is now a communication across different trainers, seen as a link from expert 1 trainer 120-1 to expert 2 trainer 120-2, . . . , and to expert K trainer 120-K. With such communication channels, the errors occurred during training of one expert may be propagated to other trainers so that learning may be further improved. After the respective trainings, diversified experts 140-1-140-K are generated and each is now capable of making decisions when provided with input data. The group of such experts are emerged through ensemble diversification.

In using experts via ensemble diversification to solve problems on issued learned, a problem solution system 150 presents input data, each of the trained experts generates, based on model derived via ensemble diversification during training, its respective decision, i.e., decision 1, decision 2, . . . , decision K. Such diversified decisions are then integrated via an expert decision combiner 160 to generate a final decision to the problem presented via the input data. In some systems, during integration, decisions from different experts may be combined in some form. For instance, an average of all decisions from different experts may be used. In some situations, a weighted sum of the decisions from different experts may be used, where the weight applied to a decision from each of the experts may be determined based on some criterion.

The traditional ensemble diversification scheme can be ineffective. FIG. 1C (PRIOR ART) shows the learning results obtained using a traditional ensemble learner called Adaboost. What is being learned is the concept of a circle and Adaboost was trained on a dataset in which the middle circle is true and the rest s false. There are five experts used in this example are implemented using decision trees. In FIG. 1C, each expert corresponds to one column; the squares in top row represents False; and the squares in the bottom row represents True. Each dot in this figure represents a decision from a corresponding expert. The darker the color a dot has, the higher the certainty in that decision. The learning results show that the experts so trained cannot accurately capture the circular concept. The first, third, and fifth experts (column 1, 3, and 5) did not predict any True decision and all decisions for False have low certainty. Expert 2 predicted the right-rail points for False and the rest are True, with high certainty. Expert 4 predicted False points in the left-rail and rest True also with high certainty. In this example, 3 out of 5 experts did not learn well. During learning, there is little control so that the learning results are hard to predict but decisions from trained experts will always be considered. In some situation, if the individual decisions are not weighed properly, the integrated decision also suffers.

Thus, there is a need for methods and systems that address such shortcomings.

SUMMARY

The teachings disclosed herein relate to methods, systems, and programming for advertising. More particularly, the present teaching relates to methods, systems, and programming related to exploring sources of advertisement and utilization thereof.

In one example, a method, implemented on a machine having at least one processor, storage, and a communication platform capable of connecting to a network for machine learning. A check is performed on a level of available bidding currency for bidding a training sample used to train a model via machine learning. A bid in an amount within the available bidding currency is sent, to a source of the training sample, for the training sample. The training sample is received from the source when the bid is successful. A prediction is then generated in accordance with the training sample based on one or more parameters associated with the model and is sent to the source.

In a different example, a system for machine learning is disclosed. The system includes a currency assessment unit, a training data bidding unit, a training data processing unit, and a training unit. The currency assessment unit is configured for checking a level of available bidding currency for bidding a training sample used for training a model via machine learning. The training data bidding unit is configured for sending, to a source of the training sample, a bid for the training sample in an amount within the available bidding currency. The training data processing unit is configured for receiving the training sample from the source when the bid is successful. The training unit is configured for sending, to the source, a prediction generated in accordance with the training sample based on one or more parameters associated with the model.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for machine learning. When the data is read by the machine, it causes the machine to perform the following various steps. A check is performed on a level of available bidding currency for bidding a training sample used to train a model via machine learning. A bid in an amount within the available bidding currency is sent, to a source of the training sample, for the training sample. The training sample is received from the source when the bid is successful. A prediction is then generated in accordance with the training sample based on one or more parameters associated with the model and is sent to the source.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional approaches in ensemble diversification. As discussed herein, the effectiveness of ensemble diversification depends on how well is the diversification that can be achieved. The traditional systems for ensemble diversification does not address diversification during learning. However, expert diversification is an important part of ensemble learning. The ensemble diversification approach disclosed herein incorporates diversification of the experts during learning. The approach learns the entire ensemble at the same time and leads every expert to improve where it currently has a lead over other experts (diversification during learning). The results in a positive feedback loop during learning and during this learning process, the greater expertise a learner gains in some sub-domain, the more likely it is that other experts would choose not to compete for that sub-domain. This mechanism is further enhanced via an auction scheme which makes sure that experts will try to control only parts of the problem space in which they are knowledgeable. The overall improvement is that this creates an ensemble of diverse experts which more likely can make decisions on unseen data at a greater accuracy than ensembles that are learned using traditional frameworks.

Figure 1A:
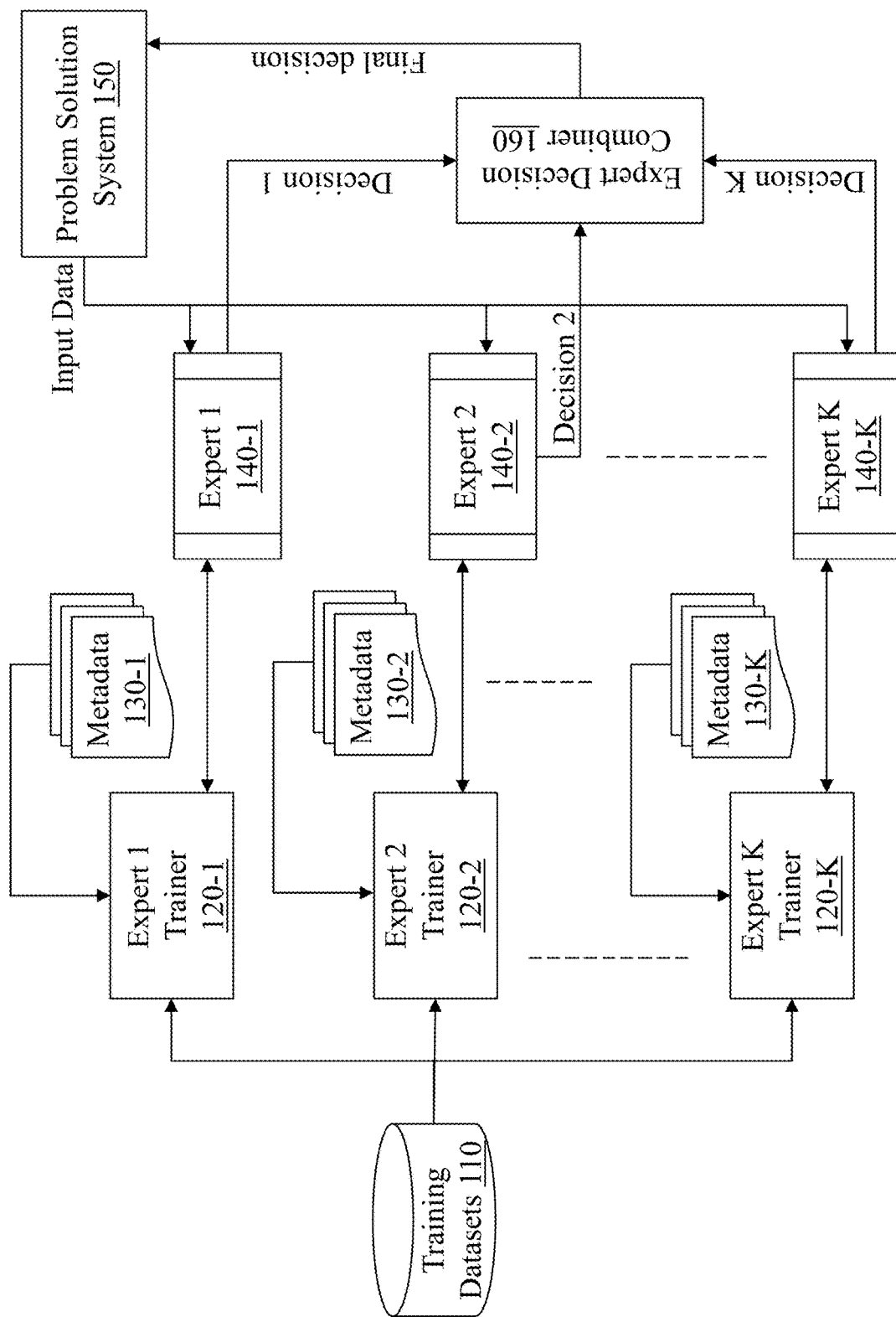
FIG. 1A shows a conventional ensemble diversification framework.
Figure 1B:
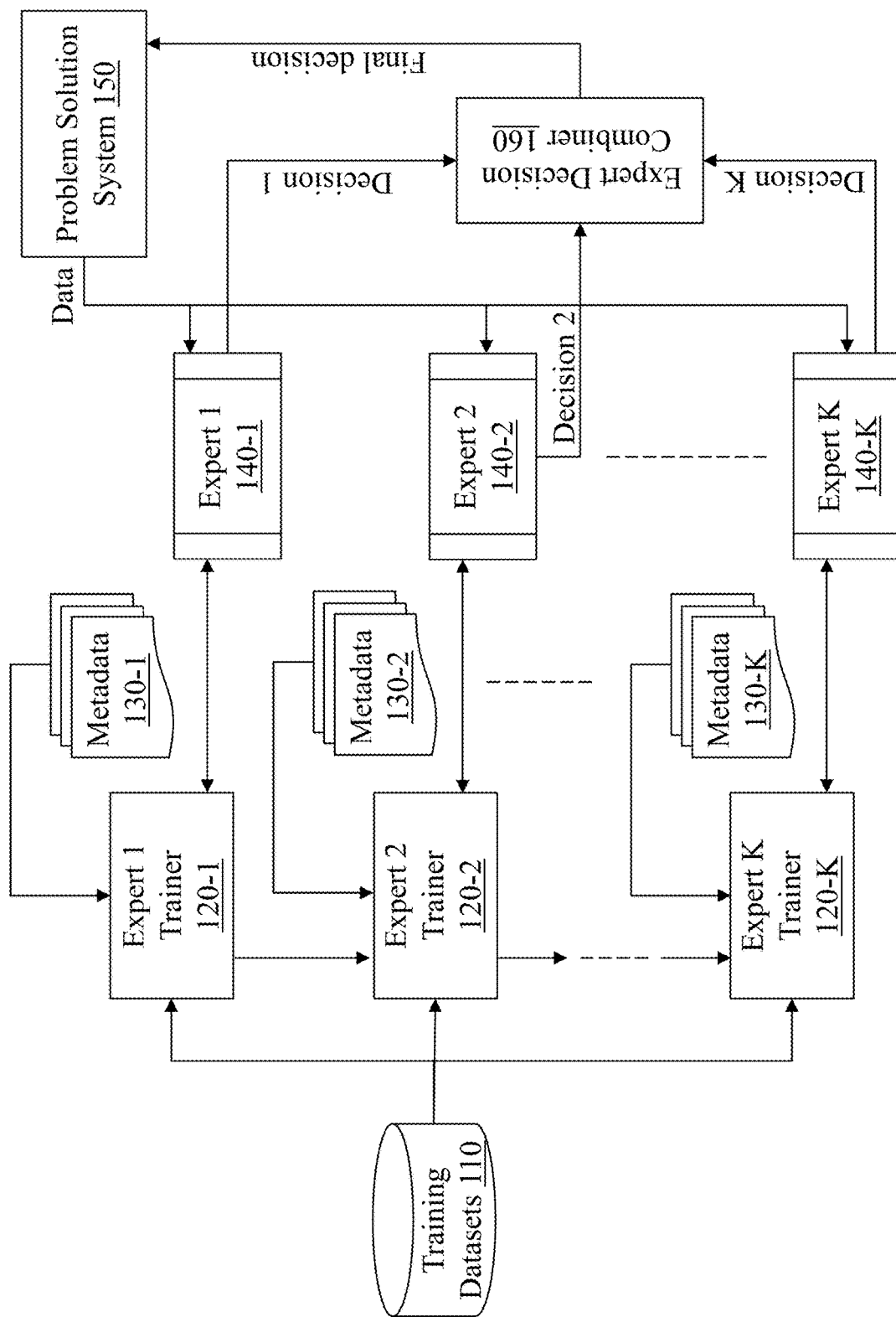
FIG. 1B shows an improved conventional ensemble diversification framework.
Figure 1C:
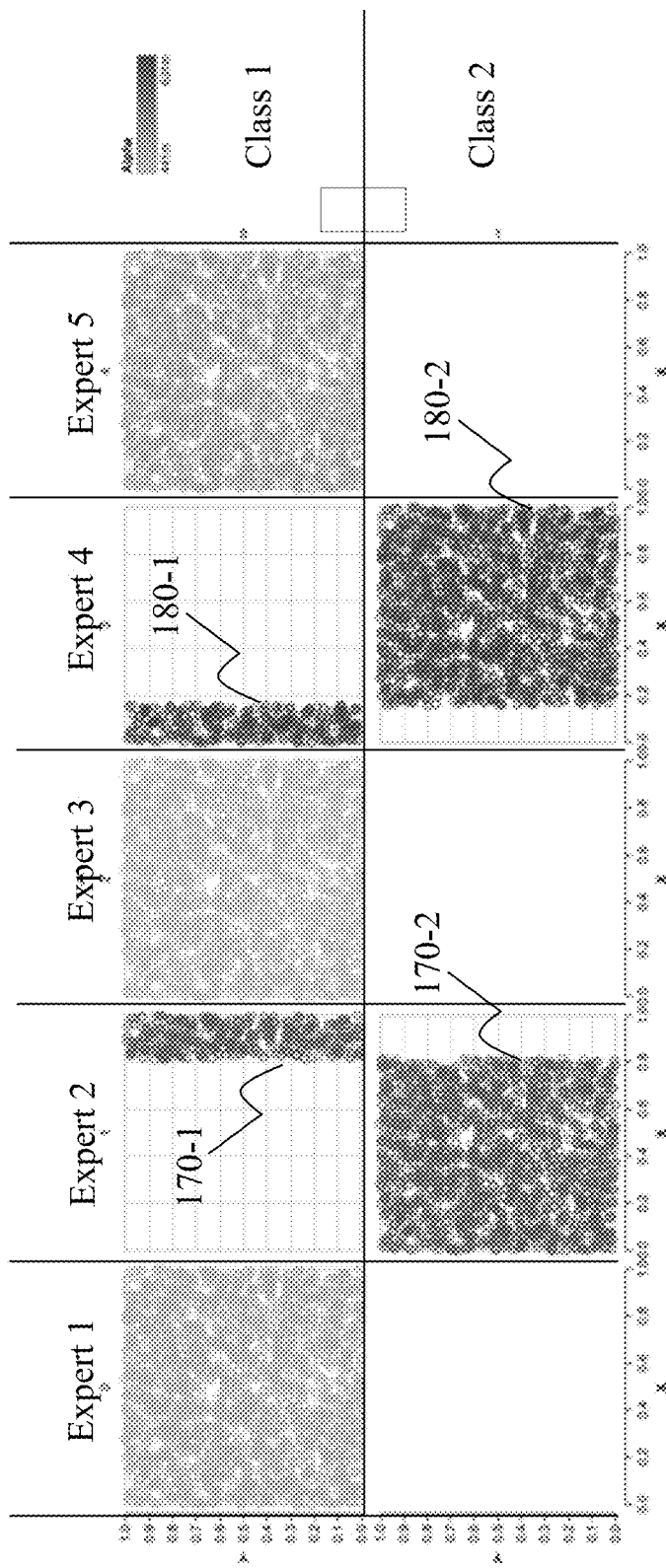
FIG. 1C illustrates learned results using conventional ensemble diversification framework.
Figure 2A:
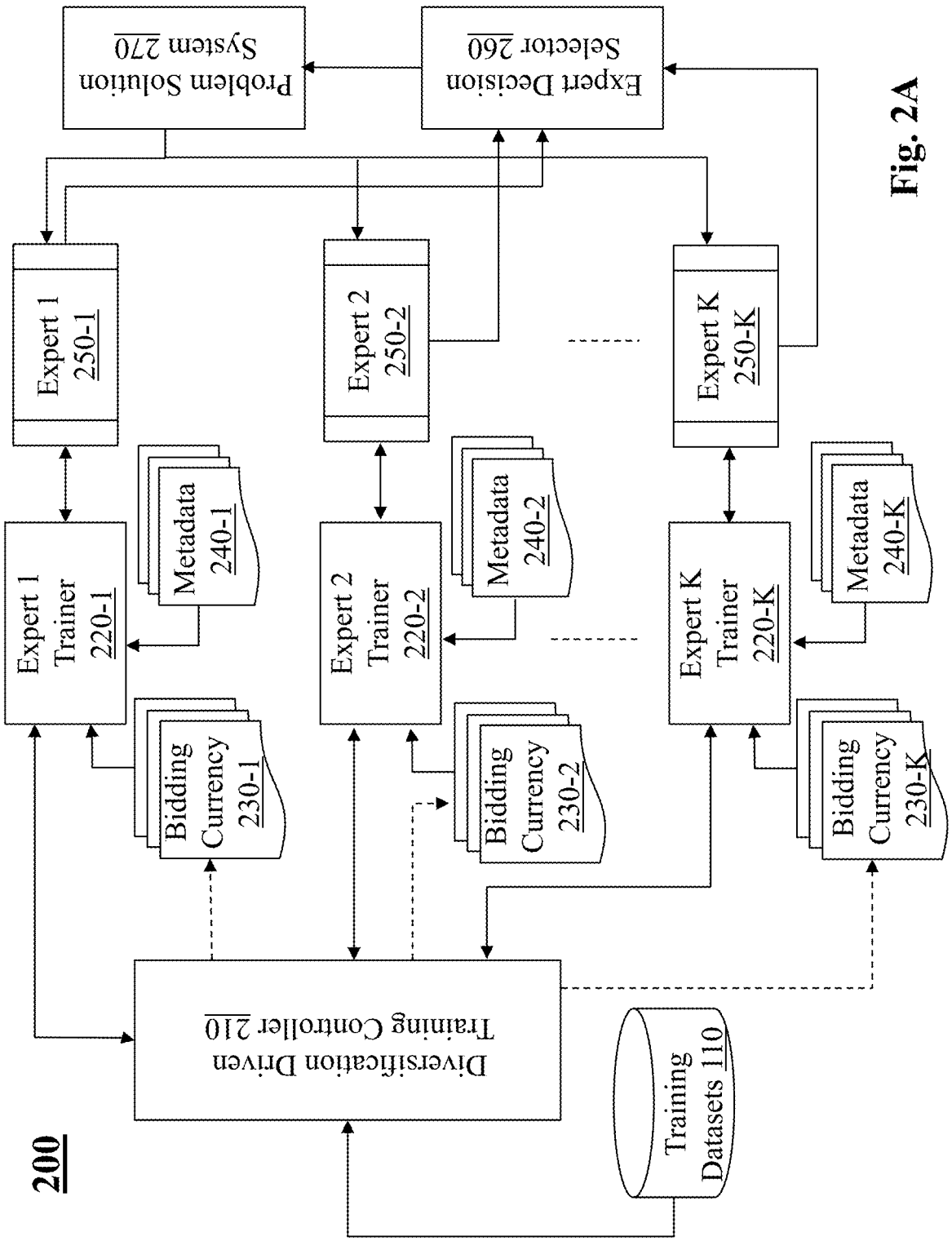
FIG. 2A depicts an exemplary framework for ensemble expert diversification via bidding, in accordance with an embodiment of the present teaching.

FIG. 2A depicts an exemplary framework 200 for ensemble expert diversification via bidding, in accordance with an embodiment of the present teaching. In this framework 200 for ensemble expert diversification, there are various components that are similar to what is shown in FIG. 1A. For example, there are a plurality of experts, expert 1 250-1, expert 2 250-2, . . . , expert K 250-K, each of which learns via its corresponding trainer, including expert 1 trainer 220-1, expert 2 trainer 220-2, . . . , and expert K trainer 220-K responsible for facilitating the learning of an associated expert. Similar to FIG. 1A, each of the trainers 2 has its own metadata, 240-1, 240-2, . . . , 240-K. There is a problem solution system 270, that feeds input data to the learned experts to seek a solution to a problem and receives a final decision from the ensemble system.

To facilitate ensemble expert diversification during training, framework 200 is different from the traditional ensemble learner systems in that the ensemble expert diversification framework according to the present teaching diversifies the experts during learning via a bidding mechanism. To achieve that, framework 200 includes different components to facilitate a learning process that diversifies experts while training. As shown, in framework 200, each of the expert trainers has an associated file storing bidding currency available to the expert trainer to use bidding for training data samples. That is, the expert 1 trainer 220-1 has bidding currency file 230-1, expert 2 trainer 220-2 has bidding currency file 230-2, . . . , expert K trainer 220-K has a bidding currency file 230-K. The bidding currency associated with an expert trainer has a dynamic currency level that changes whenever the expert trainer bids for a training sample using the available currency. The more an expert trainer receives training samples, the better the expert that the expert trainer is responsible for training will learn so as to become a better expert.

The bidding currency associated each expert trainer may be initialized at an initial level across all expert trainers. Certain bidding policies may be enforced during learning to allow diversification of experts. In some situations, bidding currency may be replenished when certain conditions are met. These are accomplished by a diversification driven training controller 210. In FIG. 2A, all expert trainers are connected with the diversification driven training controller 210 and the diversification driven training controller 210 has control over the initialization and replenish operations with respect to all the bidding currencies associated with the expert trainers. In addition, the diversification driven training controller 210 has control over the data resource stored in training datasets storage 110. Through bidding using controlled currency during training, the diversification driven training controller 210 may appropriately diversify experts by managing which and when expert trainers are to receive what training data based on, e.g., certain criteria indicative of information relevant to such diversification decisions.

Figure 2B:
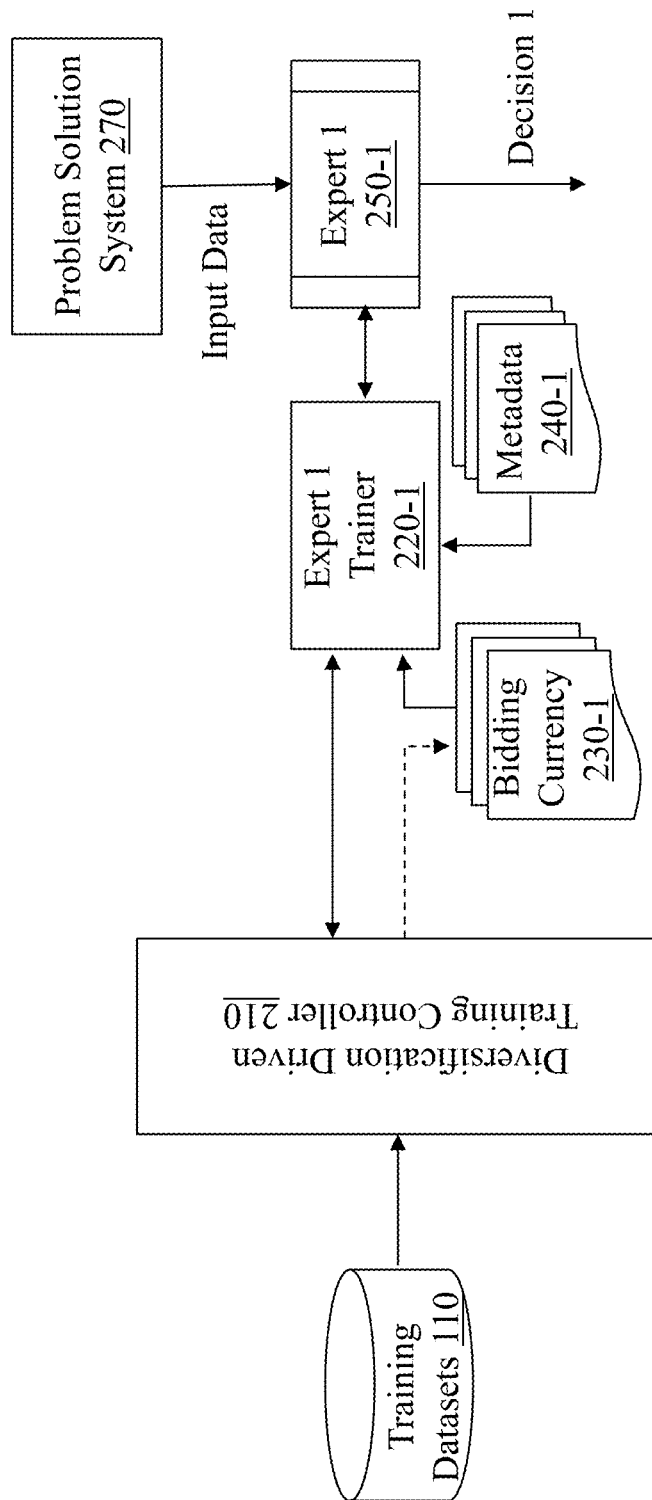
FIG. 2B depicts an exemplary configuration for learning in ensemble expert diversification via bidding, in accordance with an embodiment of the present teaching.

To illustrate how framework 200 achieves ensemble expert diversification via bidding, FIG. 2B depicts the configuration for ensemble expert diversification via bidding with respect to one expert trainer, in accordance with an embodiment of the present teaching. As seen, this is a portion of the overall framework 200 selected for the ease of specification and comprises the diversification driven training controller 210, expert 1 trainer 220-1 with associated metadata 240-1 and bidding currency 230-1, and expert 1 250-1. Before the training starts, the diversification driven training controller 210 initializes the bidding currency in 230-1 at, e.g., a set level of initial bidding currency. With respect to multiple experts, if at initialization, all experts are equally unsure or untrained, the initial level of bidding currency provided to all experts may be the same, i.e., indicating that all experts starting at the equal footing.

With the initial bidding currency provided to all expert trainers, expert trainers may receive the initial training sample(s) from the diversification driven training controller 210. For example, as shown in FIG. 2B, expert 1 trainer 220-1 receives the initial training samples from the diversification driven training controller 210 and proceeds to evaluate the training sample and produces a prediction using the metadata in 240-1. The prediction is provided with a score representing a level of confidence of the expert 1 has in the prediction. As discussed herein, metadata, e.g., 240-1, stores various relevant parameters, representing, e.g., a specific learning algorithm, parameters associated with the learning algorithm, etc. A prediction may be used as a basis for learning when an actual label representing the ground truth of the sample is received from the diversification driven training controller 210. Once the actual label is obtained, a discrepancy between a prediction and a ground truth label may then be used to learn and accordingly some parameters stored in the metadata, e.g., 240-1, may be modified to reflect the leaned knowledge.

As discussed herein, a prediction produced by an expert may be provided with a metric representing some property associated with the prediction. For example, the metric can be a confidence score indicating a level of confidence that the expert has in the prediction. Such a metric with the prediction, when provided to the diversification driven training controller 210, forms a basis for a determination on how to diversify the experts during training. The metric may be formulated to achieve certain objectives. As discussed, the metric may be a confidence level in the prediction. A metric may also be a combination of multiple metrics or measures reflecting different aspects associated with the performance of an expert trainer. Such a metric will guide the diversification driven training controller to decide how to interact with different experts during training.

An exemplary objective for diversification according to the present teaching may be to encourage specialization of some expert in certain sub-domain(s) for which the expert showed promising quality with confidence and discourage some expert in some sub-domain(s) that the expert is not doing well or lacks a reasonable level of confidence. In this manner, each learned expert is an expert of certain quality/confidence in some specific sub-domain(s) of the space in which the experts are trained to perform. With this learning scheme, different experts in the ensemble may cover different sub-domains and together the ensemble of such experts encompasses the entire space of the subject matter with reliable experts specializing in each and every sub-domain in the subject matter with high quality and confident expert performance.

To diversify experts during learning, different operations may be applied to facilitate that. First is how the diversification driven training controller 210 manages the learning process to encourage promising experts. Second is how each expert trainer bids for additional training samples based on its own confidence in different sub-domains of expertise. Third is how the diversification driven training controller 210 may reward, via dynamic bidding currency allocation during training, experts that show promising quality in their respective sub-domains of expertise. With respect to the first aspects, each expert trainer that received a new training sample evaluates the sample and produces a prediction with a score (e.g., representing its confidence in the prediction). The score (optionally with the prediction) from each expert is then transmitted to the diversification driven training controller 210, that makes an assessment on how confident each expert is accordingly based on the score and then decides to which expert(s) the actual label (ground truth) is to be provided (only when the actual label is received, an expert trainer can proceed to learn based on, e.g., a discrepancy between the prediction and the actual label).

In some embodiments, the actual label may be given to only those experts which are most confident about their respective predictions. With this criterion, only those experts who are adequately confident in their predictions receive the actual label so that they are given the opportunity to learn based on a discrepancy between the prediction and the actual label. By doing so, a positive feedback loop is created for those experts that showed confidence in what they are doing in relevant sub-domain of expertise. With such a positive feedback, promising experts can continue the learn and to improve, thus, achieving expert diversification during learning. At the same time, experts that are not confident in their predictions will not receive the actual label so that they are discouraged from pursuing learning more in the sub-domains that they lack confidence. In this manner, the present teaching achieves expert diversification during training.

Second, expert diversification during learning may also be achieved via bidding for new training samples. Each time, if an expert, say expert 1 shown in FIG. 2B, desires to receive new training samples for learning, the expert needs to bid for the desired new training samples using the bidding currency 230-1 available to it to make a bid to the diversification driven training controller 210. As each expert has only a limited bidding currency, this bidding scheme encourages each expert trainer to use its limited bidding currency wisely. In some embodiments, for example, an expert may bid for new training samples when, e.g., it has an adequate level of confidence in certain sub-domains so that it increases the probability that additional training samples will further enhance its performance and avoid using the limited bidding currency to bid for something in sub-domains that it is not so confident or has not performed well. During the bidding process, when an expert trainer, e.g., 220-1, submits a bid for additional training samples, the diversification driven training controller 210 makes a determination on whether certain training samples are to be provided to which bidding expert trainer(s).

From the perspective of the diversification driven training controller 210, the decision of how to distribute new training samples may also be made based on past performances and corresponding confidences of different experts. Such a decision mechanism further provides an opportunity to diversify experts during training.

As discussed herein, the diversification driven training controller 210 may determine, based on confidence, to which expert(s) an actual label corresponding to a training sample is to be provided to facilitate learning. Another aspect of expert diversification during learning is related to dynamic bidding currency reward. That is, in operation, the diversification driven training controller 210 may decide, based on certain criteria, reward additional bidding currency to an expert that has shown promising expertise in certain sub-domains. For instance, if an expert bids for and receives new training samples and returns corresponding predictions with high confidence scores, the diversification driven training controller 210 may, e.g., reward the expert. In some embodiments, the reward may be to provide additional bidding currency to the expert. In some embodiments, the reward may be the amount of currency that the expert used to make a bid for these training samples, i.e., replenishing the bidding currency belonging to the expert by the bidding amount. In some embodiments, it is also possible that the reward may be an amount determined based on the performance. Through this mechanism, experts that consumed their respective bidding currency yet without succeeding to get adequate new training samples will gradually be kept out from the learning.

One issue that may occur in expert diversification during learning is unbalanced resource distribution caused by resource hoarding by some experts in accompanied by chocking other experts so that other expert(s) may be eliminated entirely and quickly. When deciding which expert to get the new training samples, the expert that gives a highest bid may win. The decision may also be a combination of both bidding amount and past performance of the expert. If an expert bids several times without winning or without being able to perform well enough on the past training data, this expert's resources can be quickly depleted that prevents it from any learning activities. To avoid this potential issue, the diversification driven training controller 210 may re-adjust, when certain conditions are satisfied, the bidding currency available to experts. Such conditions may be designed to detect dynamically a situation where resources are quickly polarized among experts with unbalanced resource distribution and that starts to strangle certain experts' ability to get any training samples for learning. For example, the diversification driven training controller 210 may re-adjust the bidding currency to all experts based on, e.g., monitored difference in resource levels available to different experts and/or in levels of learning activities from different experts. The goal is to allow all experts o to remain active in learning yet diversify them to learn different sub-domains to become quality experts in relevant sub-domains.

Figure 3A:
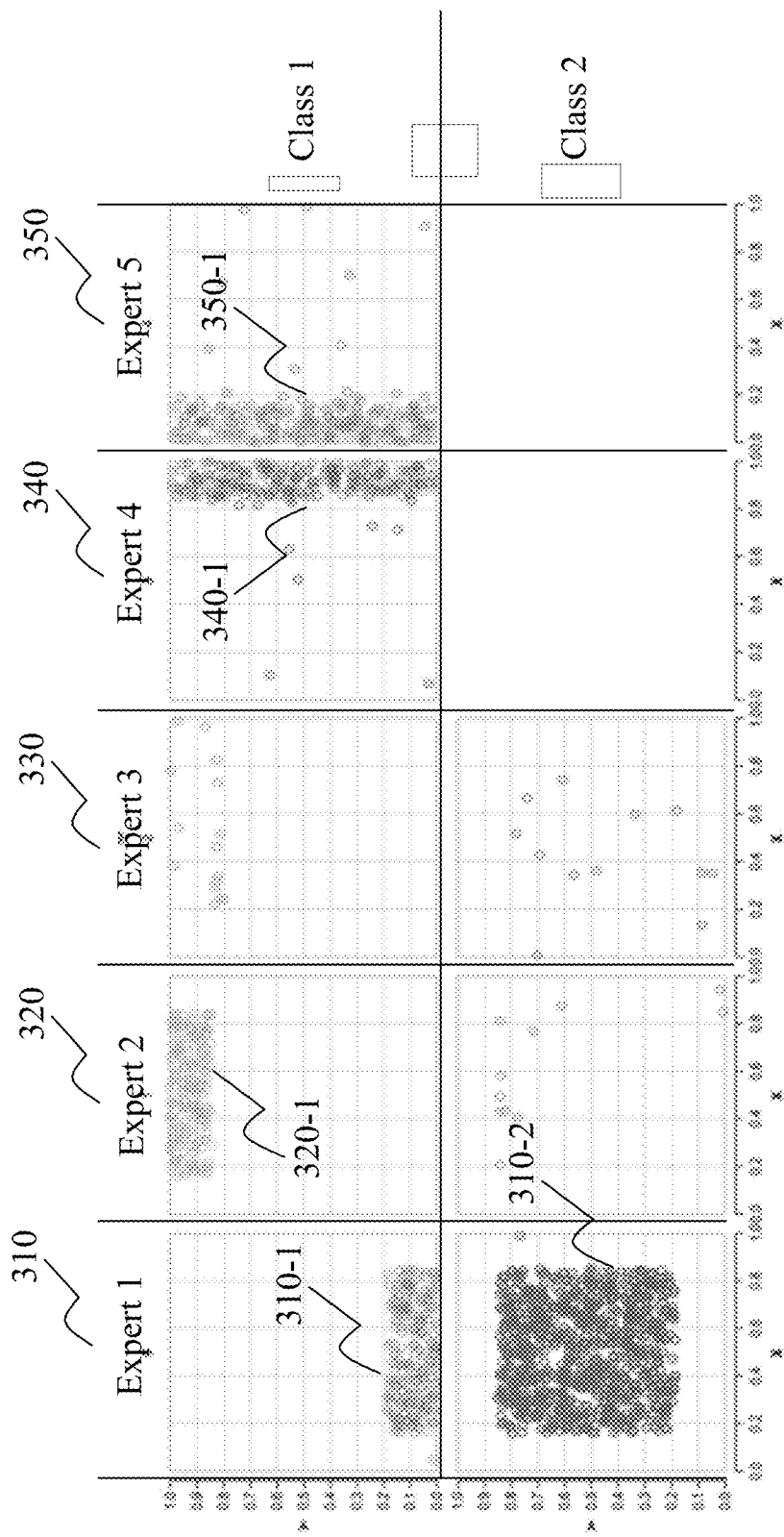
FIG. 3A shows an expert diversification results achieved via ensemble expert diversification via bidding, in accordance with an embodiment of the present teaching.

FIG. 3A shows an exemplary expert diversification result achieved via ensemble expert diversification via bidding, in accordance with an embodiment of the present teaching. This example is for the same task of capturing the concept of circular. Compared with the learning result achieved using the traditional approach, what is shown in FIG. 3A demonstrates that the five experts, 310, 320, 330, 340, and 350, trained using the ensemble expert diversification via bidding according to the present teaching are better diversified with each expert exhibiting good expertise in distinct and separate sub-domains. As cane be seen, expert 1 310 learned that dots in the center 310-2 are true, i.e., they are within the sphere. The dots in area 310-1 in the false section are what expert 1 310 believes to be false, i.e., outside of the sphere. Dots in 320-1 are what expert 2 320 believes to be false or outside of the sphere. Dots in 330-1 correspond to what expert 4 340 believes to be false or outside of the sphere. Finally, dots in 340-1 are what expert 5 350 learned to be false or outside of the sphere. As can be seen, expert 3 did not learn much or at least did not become an expert is any sub-domains.

Figure 3B:
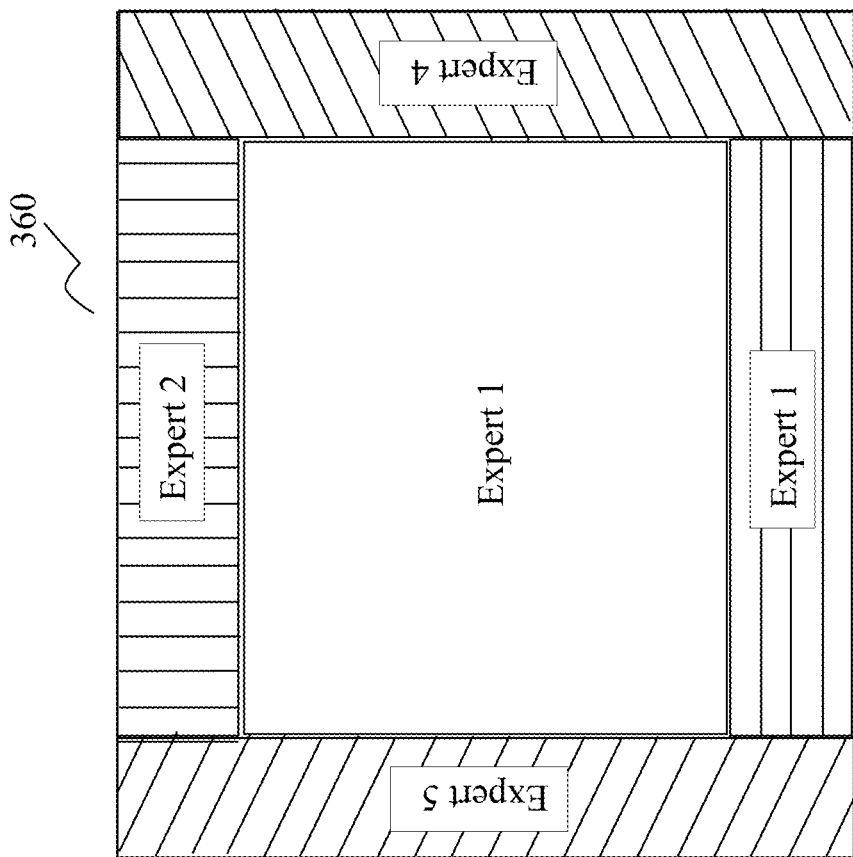
FIG. 3B shows an exemplary representation of diversified experts with diversified expertise, in accordance with an embodiment of the present teaching.

Putting all these data together, FIG. 3B shows an exemplary representation 350 of diversified experts with each having diversified expertise, in accordance with an embodiment of the present teaching. The representation 350 is generated based on the learning results shown FIG. 3A. As represented herein, 4 out of the 5 experts are diversified to become experts in different sub-domains. As seen, in the problem domain represented by square 360, there are now 5 sub-domains occupied by respective different experts, i.e., expert 1 310 now learned expertise for both the center sub-domain and the bottom sub-domain; expert 2 now has learned expertise for the upper sub-domain; expert 4 now learned expertise of the right sub-domain; and expert 5 has the expertise for the left strip sub-domain.

Figure 4A:
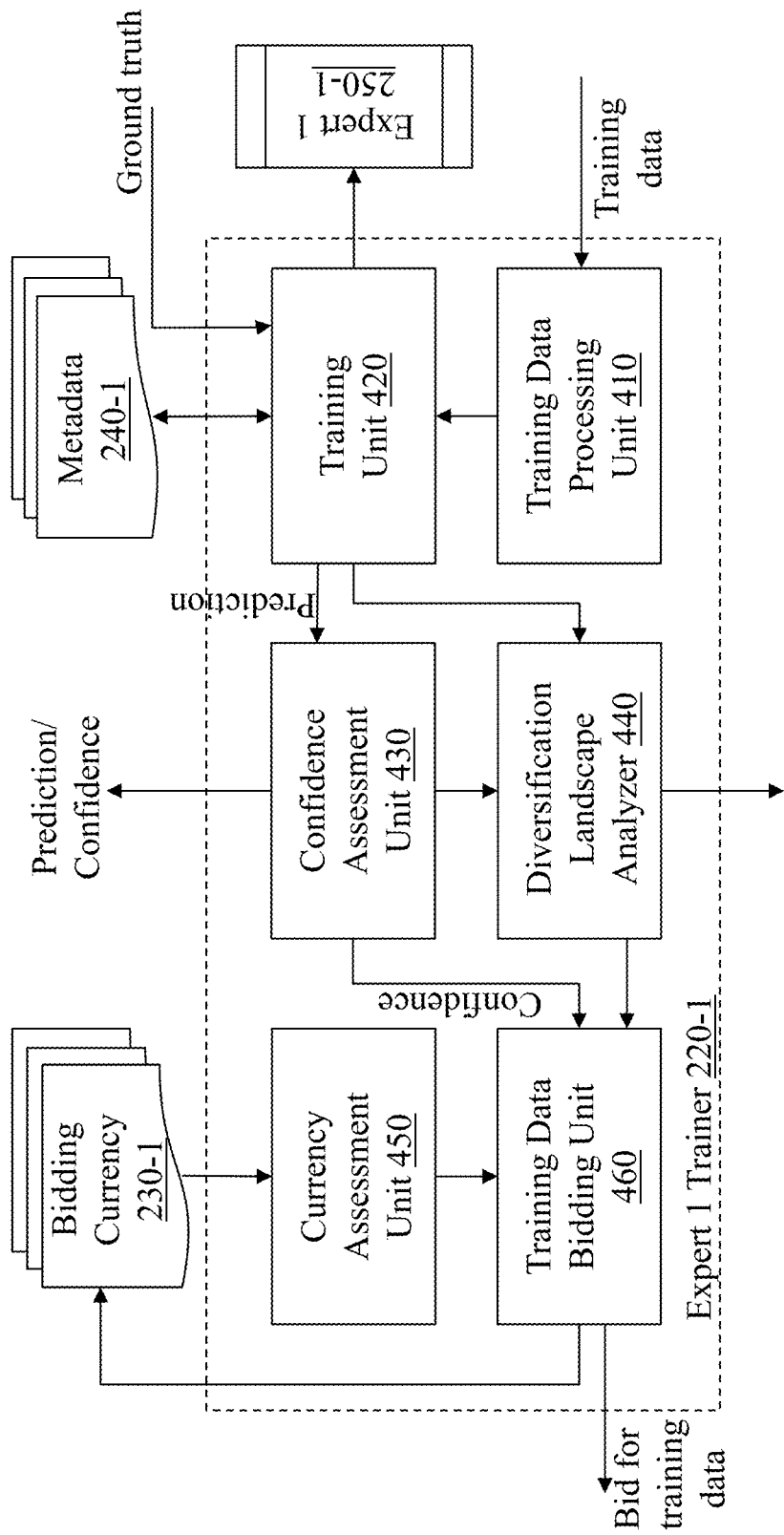
FIG. 4A depicts an exemplary high level system diagram for an expert trainer for ensemble expert diversification via bidding, in accordance with an embodiment of the present teaching.

FIG. 4A depicts an exemplary high level system diagram for an expert trainer for ensemble expert diversification via bidding, in accordance with an embodiment of the present teaching. The illustrated exemplary expert trainer, say 220-1, in FIG. 4A is configured to achieve what is so far disclosed with respect to an expert trainer. It comprises different sub-portions, including a training portion and a bidding portion. The training portion includes a training data processing unit 410, a training unit 420, a confidence assessment unit 430. The bidding portion includes a currency assessment unit 450 and a training data bidding unit 460. The exemplary trainer 220-1 further includes, optionally, a diversification landscape analyzer 440 for estimating the sub-domains that the underlying expert has gained expertise.

Figure 4B:
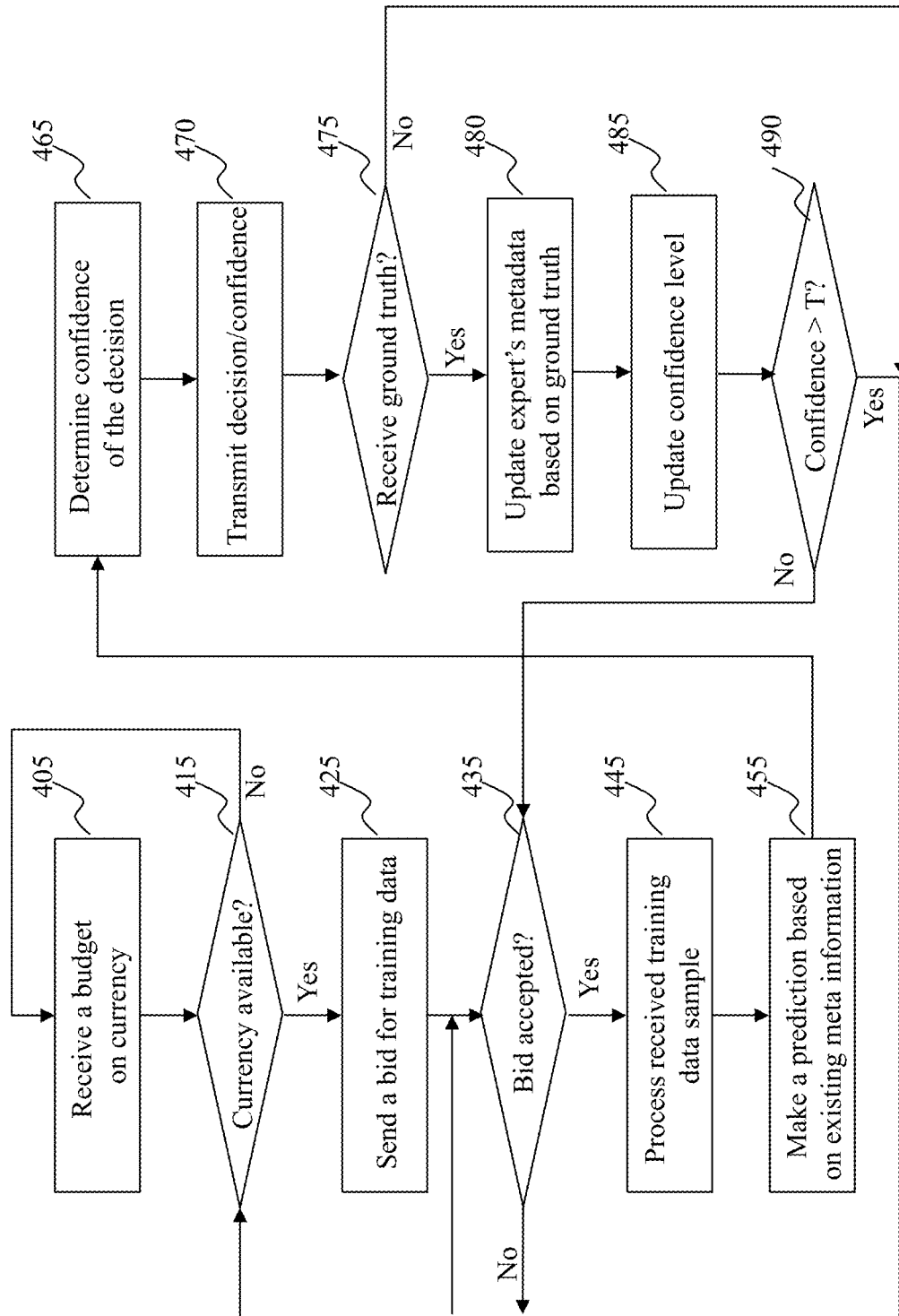
FIG. 4B is a flowchart of an expert trainer for ensemble expert diversification via bidding, in accordance with an embodiment of the present teaching.

FIG. 4B is a flowchart of an expert trainer 220-1 for ensemble expert diversification via bidding, in accordance with an embodiment of the present teaching. Initially, the expert trainer 220-1 receives, from the diversification driven training controller 210, an initial bidding currency at 405. In some embodiments, training samples are obtained via bidding. In this case, it is first determined, at 415 by the currency assessment unit 450, whether bidding currency is available for bidding for new training samples. If the bidding currency is available, the training data bidding unit 460 sends, at 425, a bid for training data to the diversification driven training controller 210. In some embodiments, when pitching for training samples, the training data bidding unit 460 may also include some metric characterizing the learning performance of the expert with the bid (if prior performance data is available). If the bid is accepted, determined at 435, the training samples are to be received by the training data processing unit 410 from the diversification driven training controller 210. When that happens, the received training data is processed by the training data processing unit 410 at 445.

In some embodiments, training samples may also be obtained without bidding. In this case, the training data processing unit 410 loops at 435 until it receives the training data from the diversification driven training controller 210 and proceeds to process, at 445, the received training data. The processed training data is then sent to the training unit 420, where a prediction is made, at 455, by the training unit 420 based on the received training data and parameters stored in the metadata storage 2401-1. As discussed herein, for each prediction made during learning, a metric is computed that characterizes the confidence that the expert has in the prediction. To do so, the confidence assessment unit 430 determines, at 465, the metric characterizing the confidence in the prediction and transmits, at 470, such determined confidence metric together with the prediction to the diversification driven training controller 210.

As discussed herein, to proceed with learning, the expert trainer 220-1 needs to receive an actual label for the training data in order to determine a discrepancy between the predicted label and the actual label and then learn therefrom. If the diversification driven training controller 210 decides to provide the actual label to the expert, determined at 475, the training unit 420 receives the actual label, which is then used by the training unit 420 in, e.g., feedback learning and determines, accordingly, how to update, at 480, certain parameters in the metadata storage 240-1 based on the feedback learning. If the actual label is not received, the processing goes back to wait for the next training sample, either via bidding or not. In this case, the learning based on the current training sample is not completed and no progress is made in the sub-domain associated with the current training sample.

In some embodiments, upon learning, the confidence metric may also need to be updated by the confidence assessment unit 430 at 485. To be aware own strength, the expert trainer 220-1 may also assess its learning and understand sub-domains in which that it has gained expertise with certain confidence. To do so, the prediction and its confidence metric the learning results may be sent to the diversification landscape analyzer 440 which reaches such assessment. Such an assessment may also be used to guide future bidding, e.g., bidding only for new training samples that the expert has confidence and has gained a certain level of expertise. This will assist the expert trainer to wisely utilizes its available bidding currency for the most promising sub-domain. For example, before determining whether to bid for new training samples in some sub-domain, the training data bidding unit 460 may determine, at 490, whether the confidence of previous predictions is above a certain level and/or whether the sub-domain is an area that the expert should invest more to learn better.

Figure 5A:
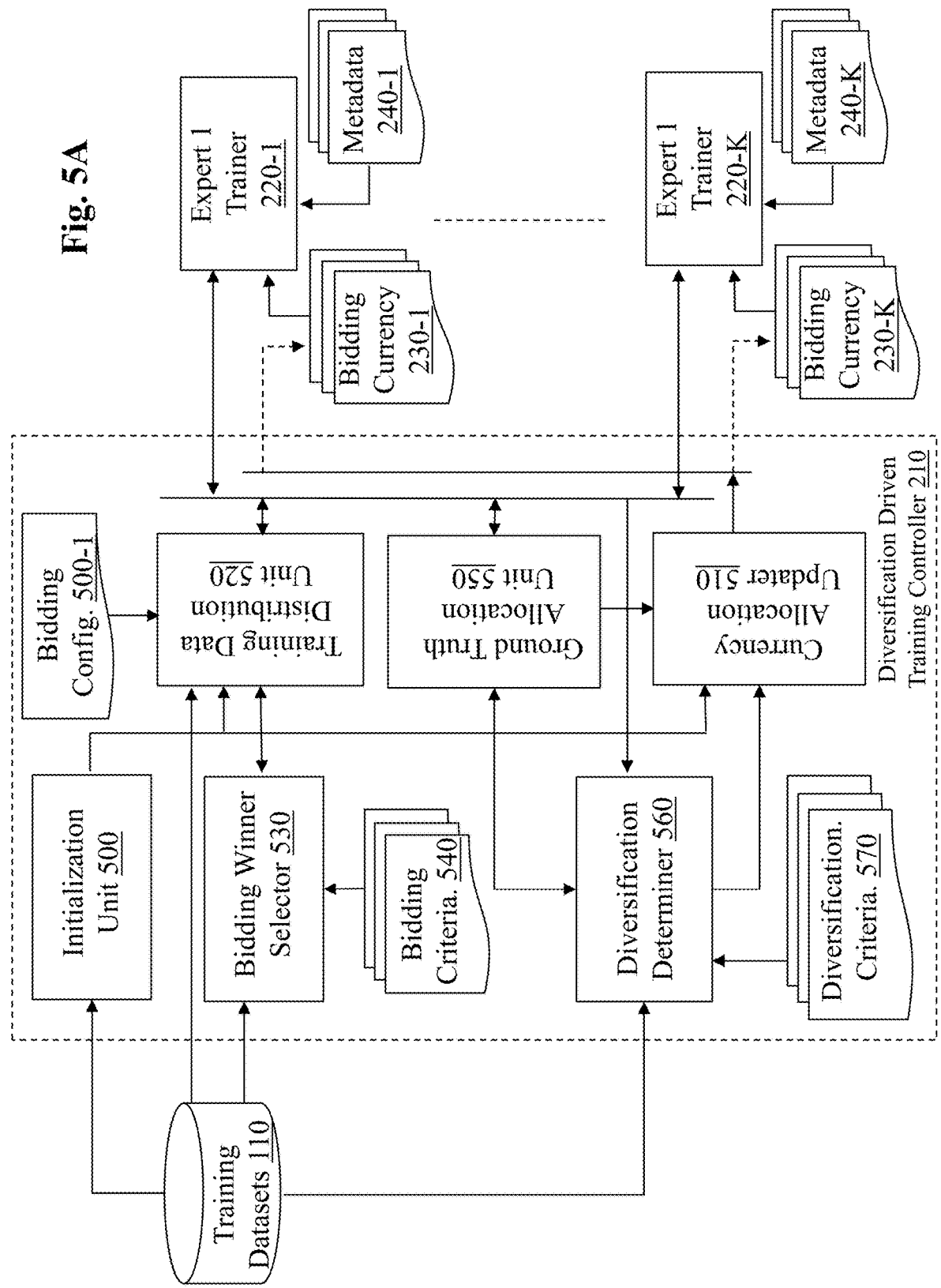
FIG. 5A depicts an exemplary high level system diagram of a diversification driven training controller, in accordance with an embodiment of the present teaching.
Figure 5B:
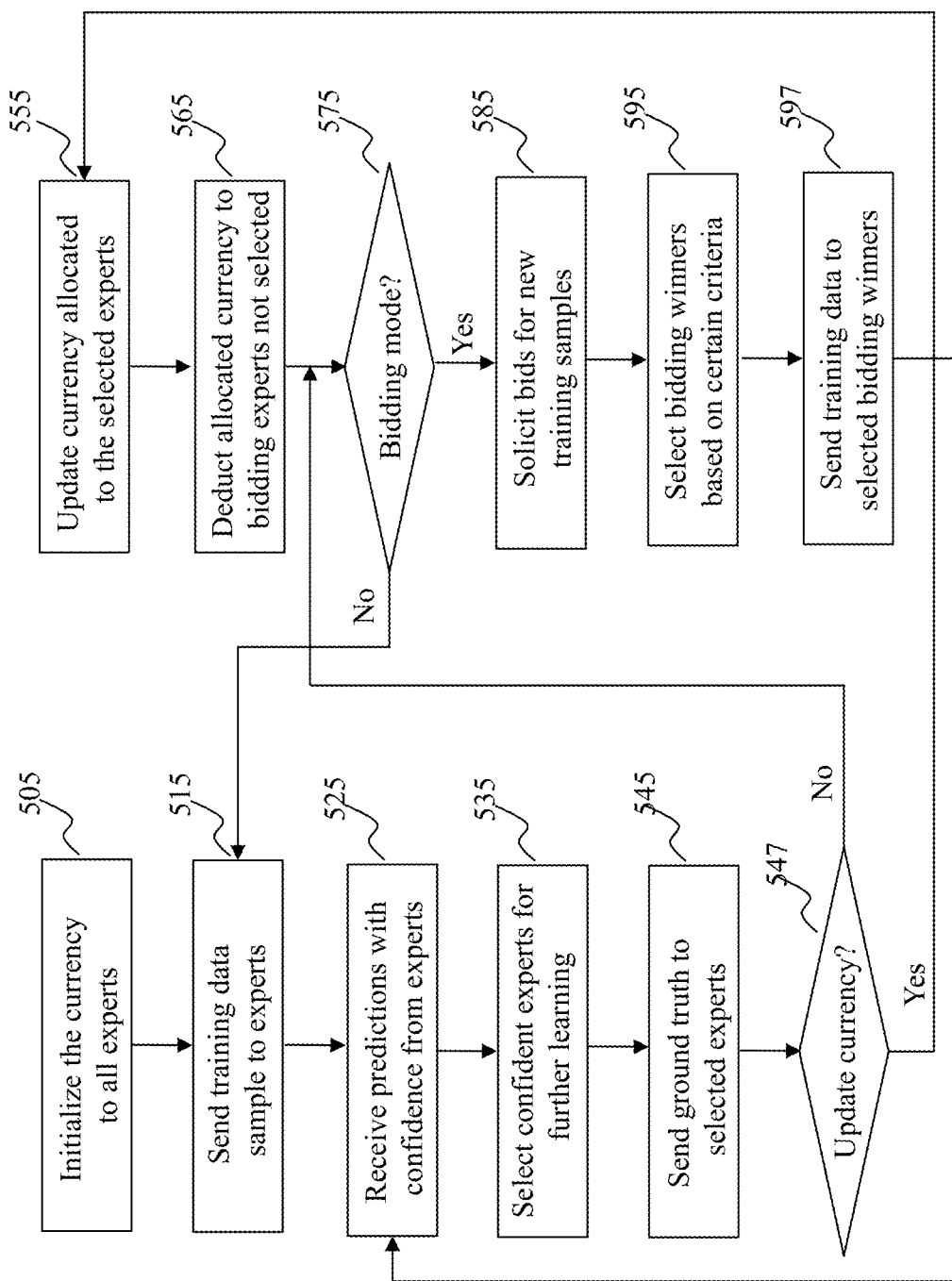
FIG. 5B is a flowchart of an exemplary process of a diversification driven training controller, in accordance with an embodiment of the present teaching.

FIG. 5A depicts an exemplary high level system diagram of the diversification driven training controller 210 in connection with expert trainers, in accordance with an embodiment of the present teaching. As illustrated, the diversification driven training controller 210 includes an initialization unit 500, a currency allocation updater 510, a training data distribution unit 520, a bidding winner selector 530, a ground truth allocation unit 550, a diversification determiner 560. FIG. 5B is a flowchart of an exemplary process of the diversification driven training controller 210, in accordance with an embodiment of the present teaching. In operation, to start the training in the expert diversification scheme as disclosed herein, the initialization unit 500 performs initialization, which includes invoking the currency allocation updater 510 to initialize, at 505, the bidding currency for all experts and then invokes the training data distribution unit 520 to retrieve an initial set of training samples and send, at 515, to the expert trainers. As discussed herein, when the expert trainers receive the initial set of training samples, they generate their respective predictions with confidence scores and send to the ground truth allocation unit 570 of the diversification driven training controller 210.

When the ground truth allocation unit 570 receives, at 525, predictions with confidence scores with respect to each training sample from different experts, it selects, at 535, one or more experts that have an adequate level of confidence in their predictions and sends, at 545, the ground truth label for the training sample to the selected experts. In some situations, based on the decisions on to which experts that a ground truth label for each training sample is sent, the level of bidding currency may need to be adjusted, if the diversification is carried out in a bidding operation mode. It is determined at 547. For example, in a bidding operation mode, if the training sample at issue is sent to an expert via bidding and the expert produces a prediction with a high confidence, the diversification driven training controller 210 may decide to give the bidding price used for getting the training sample back to the winning expert to reward for the good performance as part of the diversification. But if diversification is carried out in an operation mode where the training samples are provided to experts without bidding (e.g., the initial set of training samples are given to all experts without bidding or the learning process does not require bidding), no currency adjustment may be applied.

If bidding currency adjustment is to be carried out, determined at 547, the currency allocation updater 510 is invoked (e.g., by the ground truth allocation unit 570) to re-adjust the current level of relevant experts based on information provided by the ground truth allocation unit 570. For instance, such information may include the identification of experts for which adjustment is to be applied, the bidding price used in bidding for the samples, the performance level of each of such experts, etc. in order to facilitate decisions on how to re-adjust the levels of bidding currency of each involved expert. The currency allocation unit 510 carries out the re-adjustment of bidding currency of certain identified experts and updates, at 555, the levels of bidding currency of selected experts. In some embodiments, the bidding currency level of an expert that performed poorly may also be optionally penalized by deducting the level of bidding currency associated therewith. This is performed at 565. The level of elevation and deduction applied to each expert may need to be managed in a way to avoid resource hoarding and/or resource starvation so that all experts may still have adequate opportunity to learn what they are able to and become an expert in appropriate sub-domains.

When a round of training based on a set of training samples is completed, the training may proceed to the next. As discussed herein, ensemble expert diversification while learning may be achieved with or without bidding. When proceeding to the next round, it is determined, at 575, whether a bid for new training samples is received. If it is not in the bidding mode, the processing proceeds to step 515 where the training data distribution unit 520 retrieves training data samples from 110 and sends to the experts involved in the learning. If it is in a bidding operation mode, the process proceeds to 585, where the training data distribution unit 520 sends a solicitation to all experts to solicit bids for new training samples. When bids are received from experts, the training data distribution unit 520 forwards the bids to the bidding winner selector 530, which selects, at 595, winner experts (can be multiple) based on some bidding criteria stored in 540. Information of such selected winners may then be transmitted back to the training data distribution unit 520, which then retrieves new training samples from databases 110 and then send to the selected winning experts. Then the process repeats, whether it is in a bidding operation mode or not and proceeds to invoke the ground truth allocation unit 570 to allocate ground truth labels to experts that produced highly confident predictions.

Figure 6:
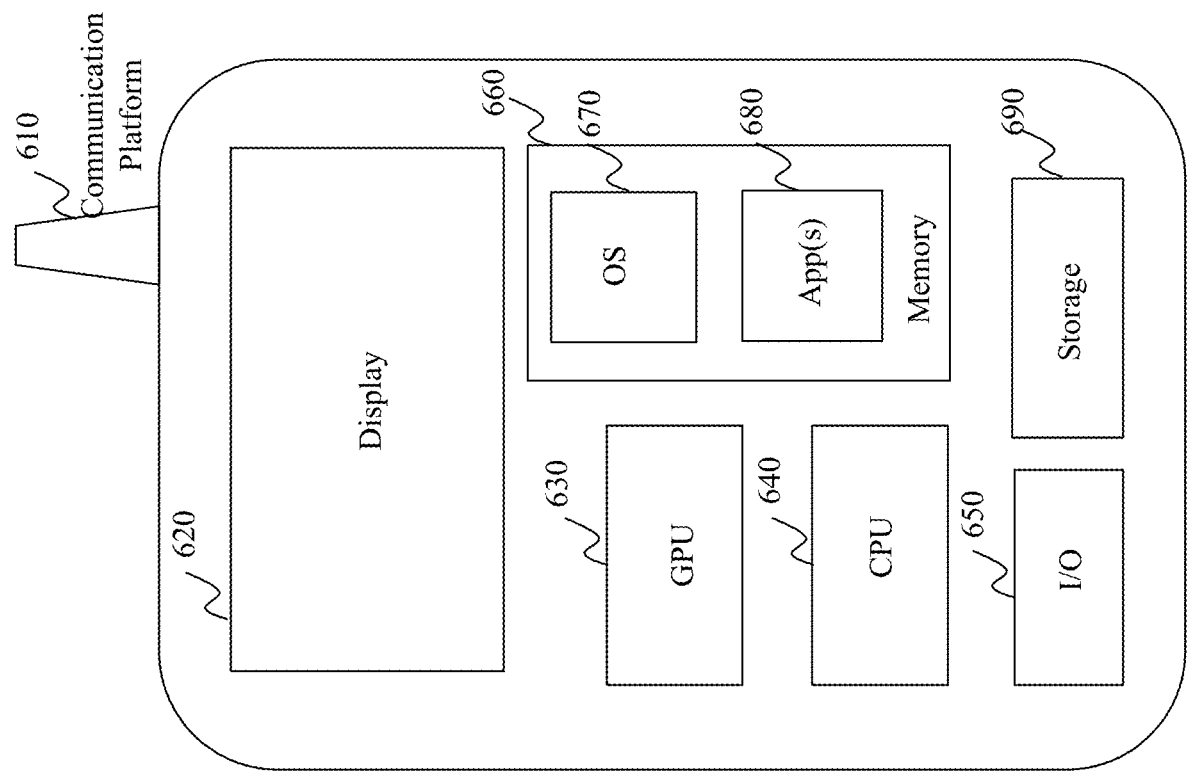
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching is implemented corresponds to a mobile device 600, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 640. Any other suitable component, including but not limited to a system bus or a controller (not shown), may also be included in the mobile device 600. As shown in FIG. 6, a mobile operating system 670 (e.g., iOS, Android, Windows Phone, etc.), and one or more applications 680 may be loaded into memory 660 from storage 690 in order to be executed by the CPU 640. The applications 680 may include a browser or any other suitable mobile apps for managing a conversation system on mobile device 1400. User interactions may be achieved via the I/O devices 640 and provided to the various components connected via network(s) 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 7:
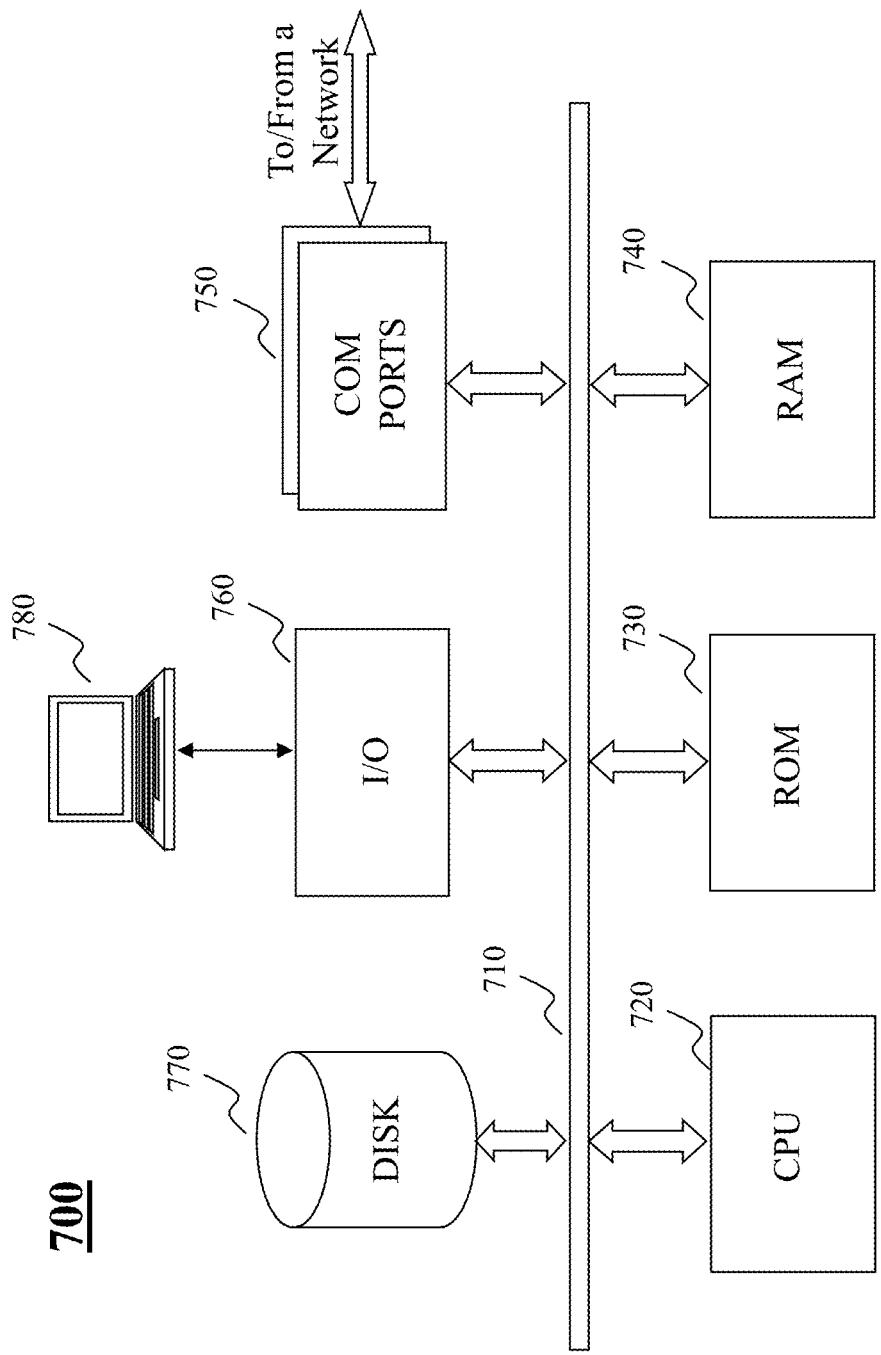
FIG. 7 is an illustrative diagram of an exemplary computing device architecture that may be used to realize a specialized system implementing the present teaching in accordance with various embodiments.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 700 may be used to implement any component of the method and system, as described herein. For example, the ensemble expert diversification system may be implemented on a computer such as computer 700, via its hardware, software program, firmware, or a combination thereof. Although only one such computer is shown, for convenience, the computer functions relating to the ensemble expert diversification as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with ensemble diversification. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the ensemble diversification techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor, memory, and communication platform capable of connecting to a network for machine learning, the method comprising:
   checking a level of available bidding currency for bidding a training sample used for training a model via machine learning, wherein the available bidding currency is dynamically allocated based on a confidence level in prediction generated during the training;
   sending, to a source of the training sample, a bid for the training sample in an amount within the available bidding currency;
   receiving the training sample from the source when the bid is successful; and
   sending, to the source, a prediction generated in accordance with the training sample based on one or more parameters associated with the model.

2. The method of claim 1, wherein the source determines how to distribute the training sample to achieve expert diversification.

3. The method of claim 1, wherein the available bidding currency is
   initialized by the source; and
   is deducted by the amount upon sending the bid to the source.

4. The method of claim 1, further comprising
   computing, with respect to the prediction, a metric characterizing the prediction; and
   sending, to the source, the metric together with the prediction to facilitate the source to determine whether a ground truth label for the training sample is to be provided.

5. The method of claim 4, wherein the metric includes a confidence score indicative of the level of confidence in the prediction.

6. The method of claim 1, further comprising
   receiving, from the source, a ground truth label corresponding to the training sample; and
   updating the one or more parameters of the model based on the prediction and the ground truth label.

7. The method of claim 6, wherein the step of updating comprises:
   computing a discrepancy between the prediction and the ground truth label;
   determining an adjustment to the one or more parameters of the model based on the discrepancy; and
   adjusting the one or more parameters in accordance with the adjustment.

8. Machine readable non-transitory medium having information recorded thereon for machine learning, wherein the information, once read by a machine, causes the machine to perform:
   checking a level of available bidding currency for bidding a training sample used for training a model via machine learning, wherein the available bidding currency is dynamically allocated based on a confidence level in prediction generated during the training;
   sending, to a source of the training sample, a bid for the training sample in an amount within the available bidding currency;
   receiving the training sample from the source when the bid is successful; and sending, to the source, a prediction generated in accordance with the training sample based on one or more parameters associated with the model.

9. The medium of claim 8, wherein the source determines how to distribute the training sample to achieve expert diversification.

10. The medium of claim 8, wherein the available bidding currency is
   initialized by the source; and
   is deducted by the amount upon sending the bid to the source.

11. The medium of claim 8, wherein the information, when read by the machine, further causes the machine to perform:
   computing, with respect to the prediction, a metric characterizing the prediction; and
   sending, to the source, the metric together with the prediction to facilitate the source to determine whether a ground truth label for the training sample is to be provided.

12. The medium of claim 11, wherein the metric includes a confidence score indicative of the level of confidence in the prediction.

13. The medium of claim 4-8, wherein the information, once read by the machine, further causes the machine to perform:
   receiving, from the source, a ground truth label corresponding to the training sample; and
   updating the one or more parameters of the model based on the prediction and the ground truth label.

14. The medium of claim 13, wherein the step of updating comprises:
   computing a discrepancy between the prediction and the ground truth label;
   determining an adjustment to the one or more parameters of the model based on the discrepancy; and
   adjusting the one or more parameters in accordance with the adjustment.

15. A system for machine learning, comprising:
   a currency assessment unit implemented with a processor and configured for checking a level of available bidding currency for bidding a training sample used for training a model via machine learning, wherein the available bidding currency is dynamically allocated based on a confidence level in prediction generated during the training;
   a training data bidding unit implemented with the processor and configured for sending, to a source of the training sample, a bid for the training sample in an amount within the available bidding currency;
   a training data processing unit implemented with the processor and configured for receiving the training sample from the source when the bid is successful; and
   a training unit implemented with the processor and configured for sending, to the source, a prediction generated in accordance with the training sample based on one or more parameters associated with the model.

16. The system of claim 15, wherein the source determines how to distribute the training sample to achieve expert diversification.

17. The system of claim 15, wherein the available bidding currency is
   initialized by the source; and
   is deducted by the amount upon sending the bid to the source.

18. The system of claim 15, further comprising a confidence assessment unit implemented with the processor and configured for:
   computing, with respect to the prediction, a metric characterizing the prediction; and
   sending, to the source, the metric together with the prediction to facilitate the source to determine whether a ground truth label for the training sample is to be provided, wherein
   the metric includes a confidence score indicative of the level of confidence in the prediction.

19. The system of claim 15, wherein the training unit is further configured for:
   receiving, from the source, a ground truth label corresponding to the training sample; and
   updating the one or more parameters of the model based on the prediction and the ground truth label.

20. The system of claim 19, wherein the step of updating comprises:
   computing a discrepancy between the prediction and the ground truth label;
   determining an adjustment to the one or more parameters of the model based on the discrepancy; and
   adjusting the one or more parameters in accordance with the adjustment.

* * * * *